May 13, 1930. G. A. SCHACHT 1,758,012
BRAKE
Filed Feb. 15, 1927 2 Sheets-Sheet 2
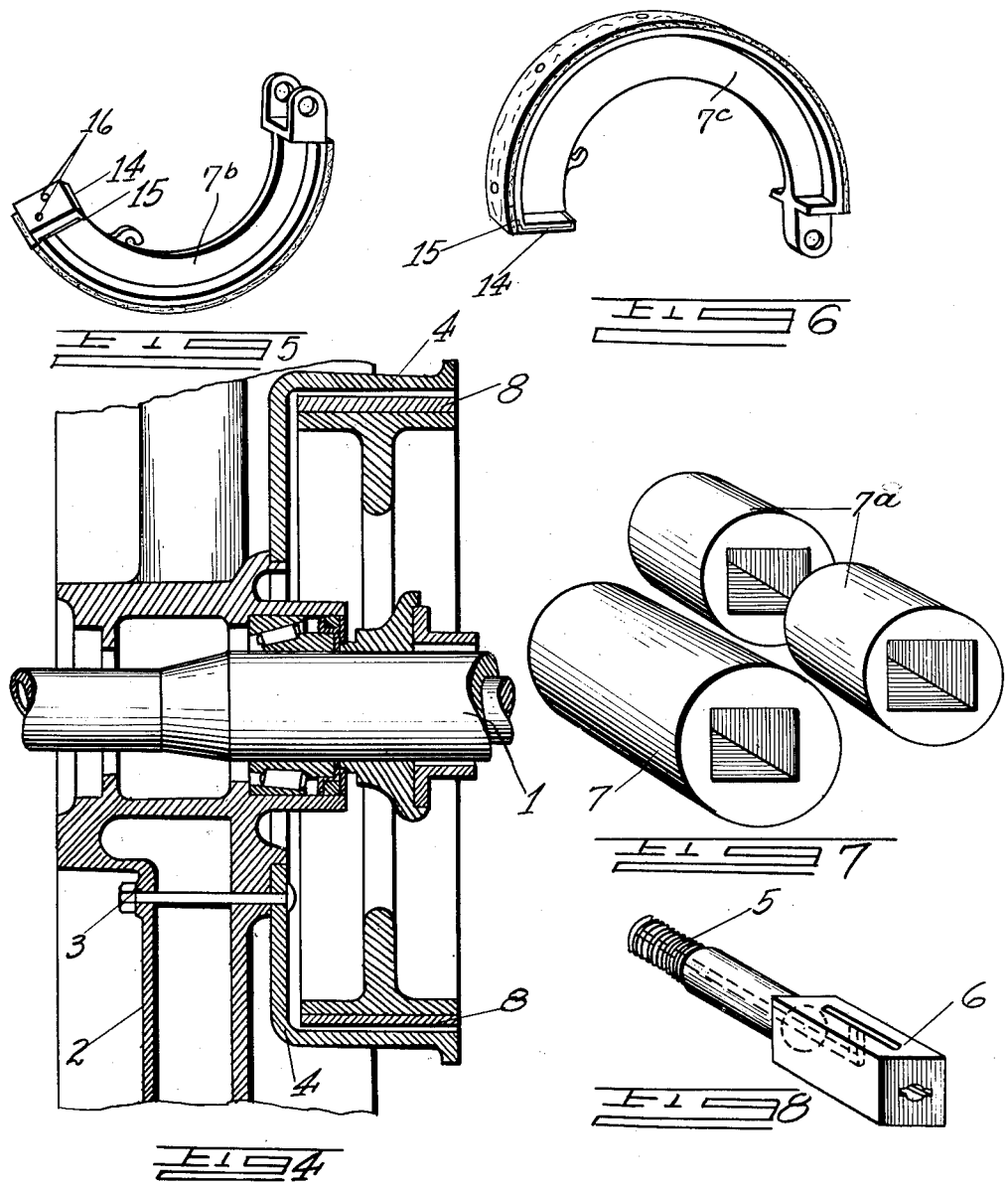
INVENTOR
Gustave A. Schacht
BY
Allen & Allen
ATTORNEY Patented May 13, 1930

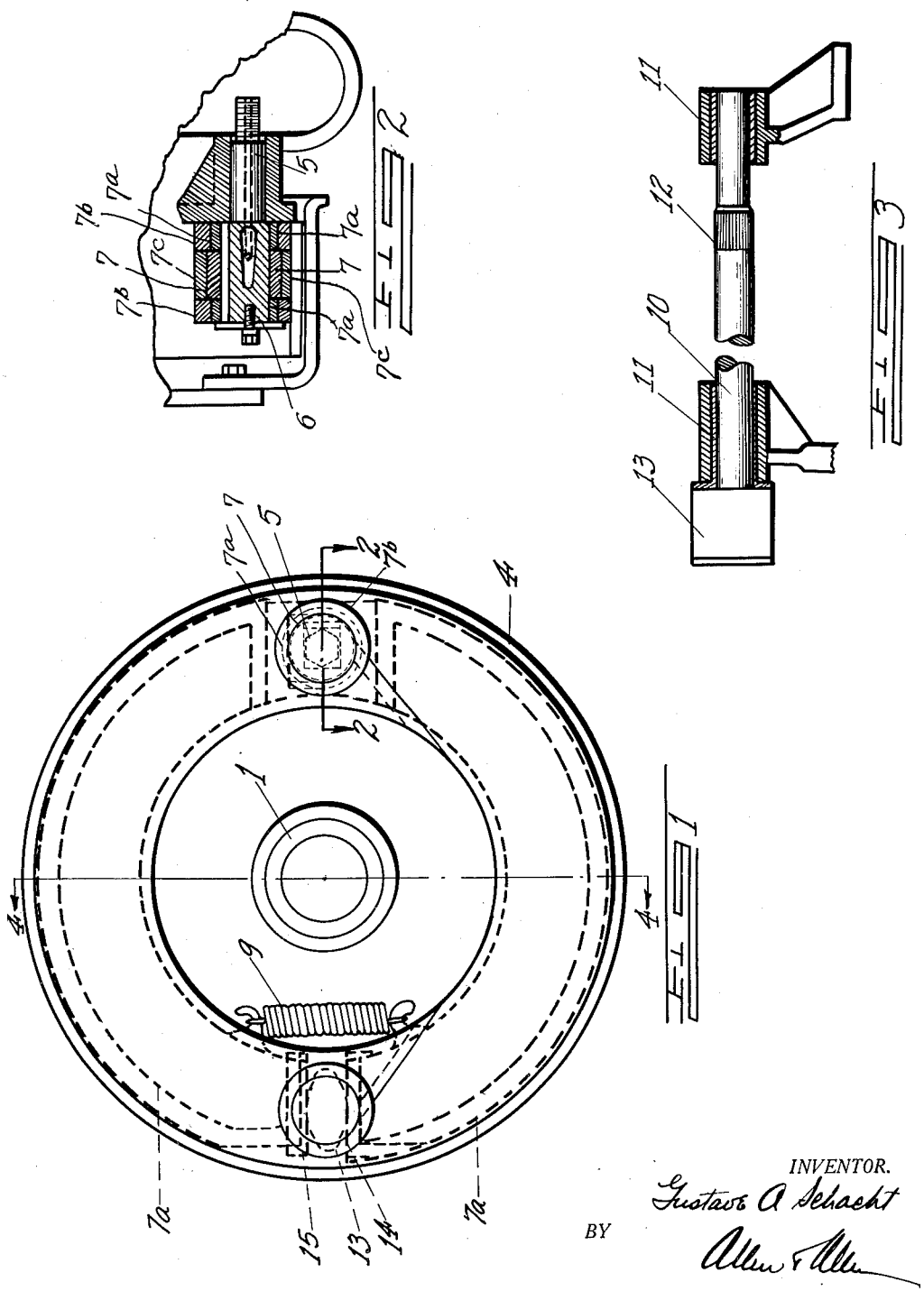

1,758,012

UNITED STATES PATENT OFFICE

GUSTAVE A. SCHACHT, OF CINCINNATI, OHIO, ASSIGNOR TO THE G. A. SCHACHT MOTOR TRUCK COMPANY, OF CINCINNATI, OHIO, A CORPORATION OF OHIO

BRAKE

Application filed February 15, 1927. Serial No. 168,440.

My invention relates to brakes, and particularly to wheel brakes for wheeled vehicles such as automobiles.

It is the object of my invention to provide an internal expanding brake assembly which will enforce a more even peripheral engagement of the frictional engaging surfaces of the brakes than has heretofore been possible.

A more or less standard type of brake to which my invention is particularly adapted consists in an outer drum with a pair of semicircular brake shoes pivoted at one side near the inner peripheral surface of the drum, with tensioned springs holding the otherwise unsecured ends of the semicircular shoes in what may be called a floating position opposite the point of pivotal support. The shoes are expanded with a cam element which bears against hardened surfaces of the shoes at their floating end, and moves them apart into frictional engagement with the drum. It is obvious that since the pivotal point of suspension of the shoes is normally fixed that when wear occurs, the first surfaces to wear are near the zones on the brake drum on the side opposite the pivotal point. Then when these zones are worn, wear will occur on the sides near the pivotal point, and thus it is rarely possible to have even wear along a substantial surface of the frictional surface of the brake band material.

Furthermore, there is a tendency for the rotation of the wheel to throw the inner shoes into such positions as will accentuate the ordinary wear of the bands. It is my object to provide a pivotal support for the bands which will permit a slight independent movement of the respective pivotal positions of the shoes, so that the rotation of the wheels will move the shoes into such positions that the application of a separating force to the shoes such as is accomplished with a cam will tend to bring about a peripheral engagement over substantially the entire braking surface.

It is further my object to provide structural improvements which will be discussed during the ensuing disclosure.

Referring to the drawings in which I have illustrated a preferred embodiment of my invention:—

Figure 1 is a side elevation from the outside of the essential elements of the brake shoe and drum assembly for a left rear wheel, with portions of the axle and wheel support only indicated.

Figure 2 is a section along the lines 2—2 in Figure 1.

Figure 3 is a detail of the cam shaft assembly.

Figure 4 is a view of the brake assembly in vertical section as would appear along the lines 4—4 in Figure 1.

Figure 5 is a perspective view of one brake shoe.

Figure 6 is a perspective view of the other brake shoe.

Figure 7 is a perspective view of brake shoe bushings.

Figure 8 is a perspective view of the spindle which supports the brake shoe bushings.

Generally indicated at 1 as shown in Fig. 4 is the axle housing of a motor truck, attached to the wheel 2 with bolts 3 in the brake drum 4. Mounted on a spindle 5 having a squared portion 6 bushings 7, 7$^a$ support the pivoted ends of the brake shoes 7$^b$, 7$^c$. It will be noted that the bushings 7, 7$^a$ which are of the same length as the thickness of the apertured portions of the shoes through which they pass, have rectangular portions which will allow for some horizontal movement of the bushings on the spindle. The brake shoes are pivotally mounted on the bushings and ordinarily have lining material such as is indicated at 8 secured to their outer peripheral surfaces. The non-pivoted end of the brake shoes are secured together by the spring 9 which normally withdraws them from engagement with the brake drum.

One of the brake shoes indicated at 7$^b$ has a forked end, and the other 7$^c$ an end which will fit within the fork of the first mentioned end. With such an arrangement, three bushings are required—two of which are indicated at 7$^a$ for the forked shoe and one which is indicated at 7 for the other. By having the inner bushing 7 slightly larger than the bushings 7ª for the forked ends, sliding of the bushings is prevented.

For moving the brake shoes into frictional engagement with the inner periphery of the drum, I have shown the brake cam shaft 10 journaled as indicated at 11, 11 having a knurled portion 12 to which is attached the brake operating rod or lever, not shown. The cam 13 being oval, is normally in position endwise to the engaging faces of the brake shoes. As the shaft 10 is rocked, the long ends of the oval cam wedge the brake shoes apart, and so cause the application of the brakes.

I have provided a structural advantage in the provision of separable hardened faces 14 for the open ends of the shoes. Whereas in the past it has been customary to apply hardened metal plates attached to the ends of the portions of the shoes which the cam bears against and to secure these plates with screws to the shoes, I have provided plates 14 with flanged edges 15 which fit over the ends of the brake shoes, thus providing bearing blocks which will not throw any of the shearing strain coincident with the application of the brakes onto the screws 16. The flanged edges take up all of this shearing strain, so that a set of bearing plates will remain in position almost indefinitely.

The operation of my novel structure is as follows: Referring to Figure 1, when the wheel rotates counterclockwise with the operation of the vehicle, the frictional drag of the upper brake shoe against the drum causes the bushings 7ᵇ to move on the square portion 6 to the right. Similarly the drag on the lower brake shoe causes the bushing 7 to move to the right. When the cam 13 is rocked the shoes are pushed back in directions opposite to those which the rotation of the wheel originally induces, and thus the lining material is moved into engagement with substantially all the inner arcs of the drums. Instead of one bearing zone for each shoe which is emphasized by the movement of the wheel, the tendency of the lining is to wear evenly. I have found that brakes made in accordance with my invention will wear much longer than in cases where the shoes are fixedly pivoted, and a substantial saving in the cost of operation of the vehicle thereby results.

Having thus described my invention, what I claim as new and desire to secure by Letters Patent, is:—

1. An internal expanding brake assembly having a pair of brake shoes journaled on slidable bushings, one of said shoes having a forked end with two slidable bushings therein, and the other shoe having a portion fitting within the forked portion, with a slidable bushing therein, said last named bushing being of greater diameter than the first-mentioned bushings.

2. An internal expanding brake assembly having a pair of brake shoes journaled on slidable bushings, one of said shoes having a forked end with two slidable bushings therein, and the other shoe having a portion fitting within the forked portion, with a slidable bushing therein of larger diameter than the two slidable bushings noted, and the diameter of said last named bushing larger than that of the bushing within the forked portions.

3. In a brake, an external drum portion, and internal expanding shoes provided with means for expanding the shoes into engagement with the inner periphery of the drum, and independent pivotal mountings for the shoes whereby one may have a slidable movement with relation to another, said mounting comprising bushings with rectangular orifices adapted to engage a squared shaft, and said bushings having different diameters.

GUSTAVE A. SCHACHT.